United States Patent [19]

Boyce

[11] Patent Number: 4,487,509

[45] Date of Patent: Dec. 11, 1984

[54] PORTABLE BLENDER

[76] Inventor: Raymond D. Boyce, 1822 Brookhaven Blvd., Norman, Okla. 73069

[21] Appl. No.: 458,560

[22] Filed: Jan. 17, 1983

[51] Int. Cl.³ .......................... B01F 7/00; B01F 7/16; B01F 13/04

[52] U.S. Cl. .................................... 366/199; 366/206; 366/279; 366/601

[58] Field of Search ........ 366/197, 199, 200, 204–207, 366/213, 279, 281–284, 314, 601; 318/46, 107, 108, 139, 441; 307/64, 66; 320/2; 340/405

[56] References Cited

U.S. PATENT DOCUMENTS

| | | |
|---|---|---|
| 1,601,934 | 10/1925 | Welch . |
| 2,042,176 | 5/1936 | Hausman . |
| 2,530,455 | 11/1950 | Forss . |
| 2,690,330 | 9/1954 | Ripple . |
| 2,930,596 | 3/1960 | Waters . |
| 3,005,399 | 10/1961 | Libson . |
| 3,200,319 | 8/1965 | Tolmie . |
| 3,257,600 | 6/1966 | Tolmie . |
| 3,289,897 | 12/1966 | Ginsberg . |
| 3,343,816 | 9/1967 | Reed . |

Primary Examiner—Timothy F. Simone
Attorney, Agent, or Firm—Dunlap & Codding

[57] ABSTRACT

A blender for blending materials having a container with a container opening extending a distance therethrough and intersecting the upper end thereof, a cap removably connectable to the open upper end of the container, a mixer connected to the cap for blending the material and a drive assembly having a portion adapted to receive the cap with the container connected thereto and another portion removably engageable with the mixer for driving the mixer to blend the material contained in the container. The drive assembly is adapted to be battery operated and the blender of the present invention includes a recharger for recharging the blender batteries. The blender includes a switch for establishing electrical continuity between the DC motor of the drive assembly and the blender batteries, and the switch is positioned and actuated in such a manner that the cap with the container connected thereto virtually must be positioned so the mixer is connected to the drive assembly before the drive assembly is conditioned in the driving condition.

17 Claims, 8 Drawing Figures

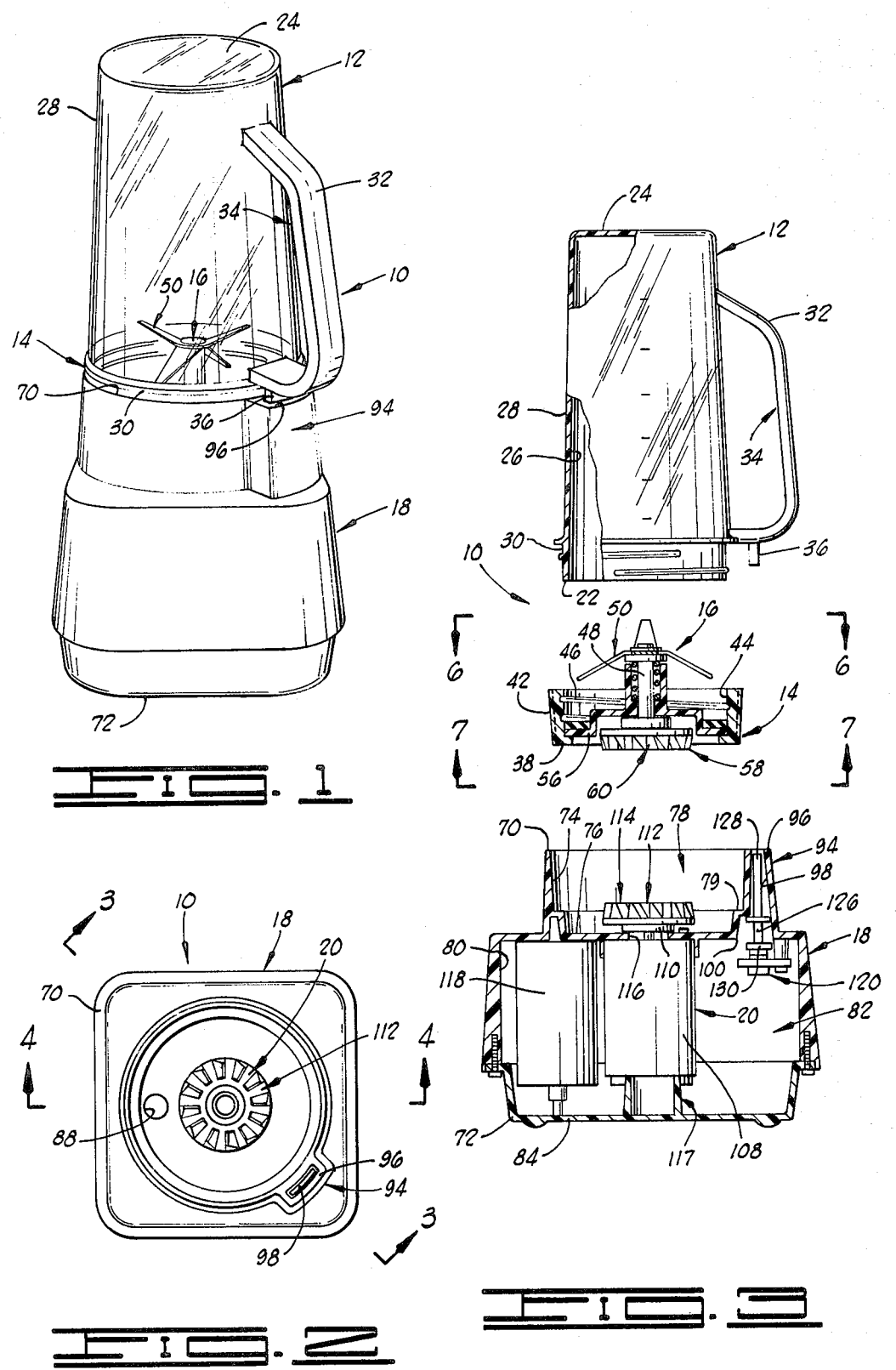

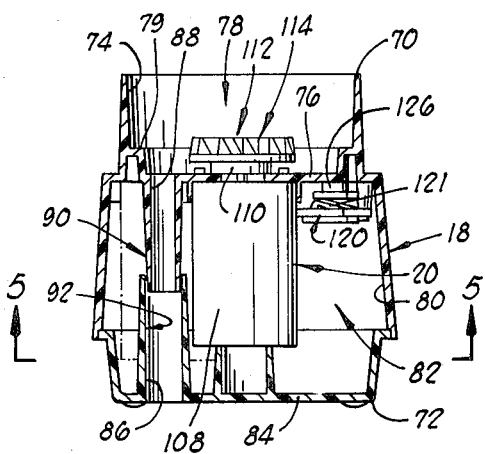

PORTABLE BLENDER

BACKGROUND OF THE INVENTION

Field of the Invention

The present invention relates generally to blenders and, more particularly, but not by way of limitation, to a portable blender wherein a cap with a mixer connected thereto is removably connectable to the open upper end of a container and the cap is removably connectable to a drive assembly for driving the mixer to blend the material in the container. The drive assembly is adapted to be battery operated and the blender of the present invention includes a recharger for recharging the blender batteries. The blender includes a switch for establishing electrical continuity between the DC motor of the drive assembly and the blender batteries, and the switch is positioned and actuated in such a manner that the cap with the container connected thereto virtually must be positioned so the mixer is connected to the drive assembly before the drive assembly is conditioned in the driving condition.

BRIEF DESCRIPTION OF THE DRAWINGS

FIG. 1 is a partial perspective view of the blender of the present invention.

FIG. 2 is a top elevational view of the support base of the blender of FIG. 1 with the container removed therefrom.

FIG. 3 is a sectional view of the blender of FIG. 1, but showing the container, the cap with the mixer connected thereto and the support base in an exploded, unconnected view, the support base being shown in a section taken substantially along the lines 3—3 of FIG. 2.

FIG. 4 is a sectional view of the support base, taken substantially along the lines 4—4 of FIG. 2.

FIG. 5 is a sectional view of the support base, taken substantially along the lines 5—5 of FIG. 4.

FIG. 6 is an elevational view of the cap with the mixer connected thereto, taken substantially along the lines 6—6 of FIG. 3.

FIG. 7 is an elevational view of the cap with the mixer connected thereto, taken substantially along the lines 7—7 of FIG. 3.

FIG. 8 is a schematic view showing a portion of the drive assembly of the blender of the present invention.

DESCRIPTION OF THE PREFERRED EMBODIMENT

Referring to the drawings in general and to FIGS. 1, 2 and 3 in particular, shown therein and designated by the general reference numeral 10, is a blender which is constructed in accordance with the present invention for blending materials. In general, the blender 10 includes a container 12 adapted to receive and retain the material to be blended, a cap 14 which is removably connectable to the container 12, a mixer 16 which is connected to the cap 14 and which is adapted to blend or mix the material disposed within a portion of the container 12, a support base 18, and a drive assembly 20 which is adapted to removably engage a portion of the mixer 16 to blend the material in the container 12 when the cap 14 with the mixer 16 connected thereto is operably disposed on the support base 18. In general, the materials to be mixed are disposed within the container 12, the cap 14 with the mixer 16 connected thereto is connected to the container 12 and the container 12 with the cap 14 connected thereto is operably disposed on the support base 18 in a position wherein a portion of the mixer 16 engages a portion of the drive assembly 20 thereby removably connecting the drive assembly 20 to the mixer 16, the drive assembly 20 driving the mixer 16 to blend the material in the container 12.

As shown more clearly in FIGS. 1 and 3, the container 12 has an upper end 22, a lower end 24, and a container opening 26 which extends a distance through the container 12 and intersects the upper end 22 of the container 12 to form an open upper end 22. The container opening 26 is shaped to receive the material to be blended through the open upper end 22 of the container 12 and to retain such material to be blended generally within the container opening 26. The container 12 has an outer surface 28 and a threaded portion 30 is formed on a portion of the outer surface 28 of the container 12, generally near the upper open end 22 of the container 12.

A handle 32 is connected to the outer surface 28 of the container 12 and the handle 32 includes a handle opening 34 which is adapted to receive a portion of an individual's hand to permit an individual to grip the container 12 via the handle 32. A switch protrusion 36 is connected to the container 12 and the switch protrusion 36 is adapted to engage a portion of the drive assembly 20 to cooperate in conditioning the drive assembly 20 in a driving condition in a manner to be described in greater detail below, the switch protrusion 36 being more particularly formed on the handle 32 and extending a distance therefrom.

As shown more clearly in FIGS. 3, 6 and 7, the cap 14 includes a cap base 38 which is generally circularly shaped. A cap wall 42 (shown in FIG. 3) is connected to or formed on the cap base 38 and the cap wall 42 extends generally circumferentially about the cap base 38, the cap wall 42 extending a distance generally perpendiculary from the cap base 38. As shown in FIG. 3, the cap wall 42 has an inner peripheral surface 44 which extends circumferentially about the cap base 38 and a threaded portion 46 is formed on a portion of the inner peripheral surface 44 of the cap wall 42. The threaded portion 46 is adapted to threadedly engage the threaded portion 30 formed on the container 12 for threadedly and removably connecting the cap 14 to the open upper end 22 of the container 12 during one aspect of the operation of the blender 10.

As shown in FIG. 3, the mixer 16 includes a mixer shaft 48 which extends through a central portion of the cap base 38 to a position wherein one end of the mixer shaft 48 is disposed on one side of the cap base 38 and the opposite end of the mixer shaft 48 is disposed on the opposite side of the cap base 38. Mixer blades 50 are connected to one end of the mixer shaft 48, the mixer blades 50 being disposed so that the mixer blades 50 are disposed within a portion of the container opening 26 when the cap 14 is connected to the open upper end 22 of the container 12. As shown in FIGS. 1 and 6, the mixer blades more particularly, comprise four mixer blades with each mixer blade extending a distance generally radially from the mixer shaft 48. The mixer blades 50 are shaped and adapted to mix or blend material engaged via the mixer blades 50 when the mixer blades 50 are rotated at a relatively high speed. Mixer blades which are adapted to mix or blend materials when rotated at relatively high speeds generally are well known in the art and a detailed description of such mixer blades is not deemed required herein. As shown in FIGS. 3 and 6, a gasket 56 is disposed generally adjacent the cap base 38 and the gasket 56 sealingly engages the mixer shaft 48 and the cap base 38 to substantially prevent fluid from leaking through the space between the mixer shaft 48 and the cap base 38 during the operation of the blender 10.

As shown in FIGS. 3 and 7, the mixer 16 also includes a generally cylindrically shaped mixer connector 58. The end of the mixer shaft 48, opposite the end of the mixer shaft 48 which has the mixer blades 50 connected thereto, is connected to a central portion of the mixer connector 58, the mixer connector 58 being disposed generally on the opposite side of the cap base 38 with respect to the disposition of the mixer blades 50. A plurality of tapered protrusions 60 are formed on one side of the mixer connector 58, each of the protrusions 60 extending a distance from the mixer connector 58 and the protrusions 60 being spaced circumferentially about the mixer connector 58.

As shown more clearly in FIGS. 3 and 4, the support base 18 has an upper end 70, a lower end 72 and a receptacle opening 62 formed through the upper end 70 and extending a distance through the support base 18 terminating with a receptacle lower end 76. The receptacle opening 74 forms a generally cylindrically shaped receptacle 78 generally on the upper end 70 portion of the support base 18 and the receptacle 78 is shaped and adapted to receive the cap 14 with the container 12 connected thereto during one aspect of the operation of the blender 10, the cap 14 being disposed generally near and spaced a distance above the receptacle lower end 76 when the cap 14 with the container 12 connected thereto is disposed within the receptacle opening 72.

A ledge 79 is formed in the receptacle 78, the ledge 79 being formed on the wall formed by the receptacle opening 74 and extending circumferentially about the receptacle opening 74. The ledge 79 extends a distance from the wall formed by the receptacle opening 74 to provide a generally upwardly facing surface in the receptacle opening 74. The ledge 79 is spaced a distance above the receptacle lower end 76 and the ledge 79 is shaped, positioned and adapted to engage a portion of the cap 14 when the container 12 with the cap 14 is disposed in the receptacle 78 thereby limiting the movement of the cap 14 in a direction generally toward the receptacle lower end 76 and spacingly supporting the cap 14 a distance above the receptacle lower end 76, for reasons to be discussed in greater detail below.

As shown more clearly in FIG. 3, an opening 80 is formed through a portion of the support base 18, the opening 80 extending a distance through the support base 18 and forming a component space 82 within the support base 18. The support base 18 includes a bottom plate 84 which is connected to the lower end 72 of the support base 18, and the bottom plate 84 is adapted to substantially encompass the opening 80 to substantially enclose the component space 82 within the support base 18 (the bottom plate 84 forming the lower end 72 of the support base 18).

As shown in FIG. 4, a drain opening 86 is formed through the bottom plate 84. A drain opening 88 is formed through a portion of the receptacle lower end 76 and the drain opening 88 is positioned and adapted to drain fluids which may accumulate within the receptacle 78 during the operation of the blender 10. One end of a drain shaft 90 is connected to the receptacle lower end 76 and the drain shaft 90 has an opening 92 which extends therethrough and intersects the opposite ends thereof, the opposite end of the drain shaft 90 being connected to the bottom plate 84. The drain shaft 90 provides fluidic communication between the drain openings 86 and 88 so that fluids which might accumulate within the receptacle 78 during the operation of the blender 10 are drained through the drain opening 88, through the opening 92 in the drain shaft 90 and out from the support base 14 through the drain opening 86 in the bottom plate 84. In a preferred form, the drain shaft 90 is constructed of two parts with one part being connected to the receptacle lower end 76 and the other part being connected to the bottom plate 84 and with the two parts being removably connectable when the bottom plate 84 is connected to the support base 18, as shown in FIG. 4.

As shown more clearly in FIGS. 1 and 3, a switch housing 94 is formed on the support base 18 with a portion of the switch housing 94 being disposed generally adjacent the receptacle 78 and with an upper end 96 of the switch housing 94 being generally coplanar with the upper end 70 of the support base 18. A housing opening 98 extends through the switch housing 94 intersecting the upper end 96 and a lower end 100 of the switch housing 94. The housing opening 98 is in communication with the component space 82 formed within the support base 18, as shown in FIG. 3. The housing opening 98 in the switch housing 94 is shaped and adapted to receive the switch protrusion 36 formed on the handle 32 of the container 12 when the container 12 is positioned on the support base 18 for blending materials within the container 12, for reasons and in a manner which will be described in greater detail below.

As shown in FIGS. 3, 4 and 8, the drive assembly includes a DC motor 108 having an output drive shaft 110. A cylindrically shaped drive connector 112 is connected to one end of the drive shaft 110. The drive connector 112 includes a plurality of tapered protrusions 114 formed in the upper surface thereof, the protrusions 114 being spaced circumferentially about the drive connector 112 and each of the protrusions 114 extending a distance from the drive connector 112. The tapered protrusions 114 are shaped and positioned on the drive connector 112 to mate with the protrusions 60 on the mixer connector 58 so that in a connected position each of the protrusions 60 extends into one of the spaces formed between the protrusions 114, the mating connection between the protrusion 60 and the protrusions 114 removably connecting the mixer connector 58 to the drive connector 112. The tapered portions on the protrusions 60 and 114 cooperate to move the connectors 58 and 112 into a mating, connected position of the connectors 58 and 112.

As shown in FIG. 3, an opening 116 is formed through the receptacle lower end 76 and the opening 116 provides communication between the receptacle 78 and the component space 82. As shown in FIGS. 3 and 4, the DC motor 108 is mounted vertically on the bottom plate 84 and disposed generally within the component space 82. The DC motor 108 is mounted on a motor support 117 which is connected to the support base 18 and disposed in the component space 82 to position and support the motor 108 in the component space 82 so that the drive shaft 110 extends through the opening 116 in the receptacle lower end 76 to a position wherein the drive connector 112 is disposed generally within the receptacle 78, the drive connector 112 being positioned slightly above the receptacle lower end 76.

As shown more clearly in FIGS. 5 and 8, the DC motor 108 is connected to an electrical energy supply comprising three batteries 118 (the individual batteries being designated 118a, 118b and 118c in FIG. 5), a switch 120 is electrically interposed between the batteries 118 and the DC motor 108. The batteries 118 are disposed and supported within the component space 82 of the support housing 18, as shown in FIGS. 3 and 5.

The switch 120 has an opened and a closed position and the switch 120 is adapted to provide electrical communication between the batteries 118 and the DC motor 108 in the closed position of the switch 120, the switch 120 operating to interrupt electrical communication between the batteries 118 and the DC motor 108 in the opened position of the switch 120. The switch 120 has a switch arm 121 (shown in FIG. 4) which is normally opened (the switch 120 being in the normally opened position). The switch 120 is connected to the support base 18 and disposed in the component space 82 so that the switch arm 121 is disposed near the lower end portion of the housing opening 98 of the switch housing 94, as shown more clearly in FIGS. 3 and 4.

As shown in FIG. 8, a battery charger 122 is connected to the batteries 118 and the battery charger 122 includes an electrical connector 124 which is adapted to connect the battery charger 122 to an AC electrical power source (not shown). The battery charger 122 functions to receive the AC signal from the AC power source, to rectify the received AC signal and to connect a DC charging signal to the batteries 118 for recharging the batteries 118. In a preferred form, the battery charger 122 also is adapted to automatically disconnect the DC charging signal from the batteries 118 when the charge on the batteries 118 has reached a predetermined level.

In one operable embodiment, the DC motor 108 is a 6 volt DC motor adapted to drivingly rotate the drive shaft 110 in a range from about 6500 rpm to about 10,400 rpm in a driving condition of the DC motor 108 or, in other words, when the DC motor 108 is connected to or in electrical communication with the batteries 118. A DC motor of the type just described is commercially available from Mabuchi, Model No. 550S-6530, for example. A battery charger adapted to function in a manner like that described before with respect to the battery charger 122 is commercially available from Gates, Model No. 0813-4011, for example. A switch which is adapted to operate like that described before with respect to the switch 120 is commercially available and marketed under the model designation "Series 523 Light Force Type" or "Series 525 Standard Basic Type".

As shown in FIGS. 3 and 4, a plunger 126 is disposed within the housing opening 98 of the switch housing 94. The plunger 126 has an upper end 128 and a lower end 130 (shown in FIG. 3), the upper end 128 portion of the plunger 126 extending a distance through the housing opening 98 to a position wherein the upper end 128 is disposed a distance below the upper end 96 of the switch housing 94. The lower end 130 engages the switch 120 or, more particularly, the switch arm 121 and the switch 120 supports the plunger 126 in the housing opening 98. When a force is applied to the upper end 128 of the plunger 126, the plunger 126 is moved in a direction generally away from the upper end 96 of the switch housing 94 and in a direction generally toward the switch 120. The switch 120 is normally opened and the switch 120 is adapted to be positioned in the closed position via the engagement between the lower end 130 of the plunger 126 and the switch 120 or, more particularly, the switch arm 121. In the non-operating position, the switch arm 121 biasingly supports the plunger 126 in the switch housing 94 and, thus, in this position of the plunger 126, the switch 120 remains in the normally opened position interrupting electrical continuity between the DC motor 108 and the batteries 118.

In operation, an individual pours or otherwise disposes the materials to be mixed in the container opening 26, the materials to be mixed being inserted through and received through the open upper end 22 of the container 12. After the materials to be mixed have been disposed within the container opening 26, the cap 14 is threadedly connected to the open upper end 22 of the container 12 thereby disposing the mixer blades 50 generally within the container opening 26. The container 12 with the cap 14 connected thereto then is disposed within the receptacle opening 74. The container 12 with the cap 14 connected thereto is inserted within the receptacle opening 74 to a position wherein the cap 14 engages the ledge 79, the ledge 79 limiting the movement of the cap 14 in the receptacle opening 74 in a direction generally toward the receptacle lower end 76 and positioning the cap 14 spaced a predetermined distance above the receptacle lower end 76. In this position of the cap 14 within the receptacle 78, the protrusions 60 on the mixer connector 58 are disposed within the spaces between the protrusions 114 on the drive connector 112 and the protrusions 60 are engageable with the protrusions 114 to drivingly connect the drive assembly 20 or, more particularly, the drive connector 112, to the mixer 16 or, more particularly, to the mixer connector 58, the tapers on the protrusions 60 and 114 facilitating the connection of the connectors 58 and 112. As the container 12 with the cap 14 connected thereto is inserted into the receptacle opening 74, the container 12 is oriented so that the switch protrusion 36 on the handle 32 is generally aligned with the open upper end 96 in the switch housing 94 or, more particularly, the housing opening 98. As the container 12 with the cap 14 connected thereto is inserted in the recepacle opening 74, the switch protrusion 36 is disposed within the housing opening 98, the switch protrusion 36 engaging the upper end 128 of the plunger 126 and moving the plunger 126 in a generally downwardly direction toward the switch 120. When the container 12 with the cap connected thereto has been inserted in the receptacle opening 74 to a position wherein the mixer connector 58 is connected to the drive connector 112 or, in other words, to a position wherein the cap 14 engages the ledge 79, the switch protrusion 36 has moved the plunger 128 against the switch arm 121 to a position wherein the switch arm 121 has been moved to the closed position, thereby moving the switch 120 to the closed position and establishing electrical continuity between the batteries 118 and the DC motor 108. When electrical continuity is established between the batteries 118 and the DC motor 108, the DC motor 108 drivingly rotates the drive shaft 118 thereby drivingly rotating the mixer blades 50 via the connection provided between the drive shaft 110 and the mixer 16 provided by the mixer connector 58 and the drive connector 112. The driving rotation of the mixer blades 50 functions to blend the material within the container opening. After the material within the container opening 26 has been mixed or blended, the individual moves the container 12 with the cap 14 connected thereto in an upwardly direction thereby moving the switch protrusion 36 in an upwardly direction to permit the plunger 126 to be moved via the biasing force of the switch arm 121 in an upwardly direction to a position wherein the switch arm 121 has been moved to the opened position thereby causing the switch 120 to be positioned in the normally opened position interrupting electrical continuity between the batteries 118 and the DC motor 108. After the container 12 with the cap 14 connected thereto has been removed from the receptacle opening 74, the individual removes the cap 14 from the container 12 and the container 12 then functions as a cup for drinking the mixed material within the container opening 26. The handle 32 on the container 12 functions to provide a means for an individual to grip the container 12 for moving the container 12 into the receptacle opening 74 and for using the container 12 as a "drinking container" or "drinking mug".

Should the charge on the battery 118 become low, the individual can connect the drive assembly 20 to an AC power source utilizing the connector 124. When the battery charger 122 receives the AC signal, the battery charger 122 provides a rectified DC charging signal for charging the batteries 118. Since the DC motor 108 is operated from a battery 118 source of energy, the blender 10 of the present invention is portable. The battery charger 122 permits the batteries 118 to be recharged which enhances the portable aspect of the blender of the present invention.

In a preferred embodiment, the container 12 is shaped and adapted such that the container opening 26 is capable of holding about 14 ounces of material to be mixed or mixed material, as the case may be. Since the blender 10 is portable, in this manner an individual can conveniently place a single serving of material within the container opening 26, blend the material and then use the container 12 as a drinking container for drinking the mixed material, the handle 32 functioning to provide a means for the individual to grippingly support the container 12 while mixing the material and while drinking the mixed material.

The switch protrusion 36 and the plunger 126 cooperate so that the drive assembly 20 is not conditioned in a driving condition unless the container 12 has been inserted within the receptacle opening 74 for mixing the materials contained within the container opening 26, thus the switch protrusion 36 on the container 12 and the plunger 126 which is disposed within the switch housing 94 cooperate to provide a safety switch to virtually assure that the blender 10 is not inadvertently conditioned in a driving condition thereby cooperating to provide a "safety start" for the blender 10.

Changes may be made in the various parts, elements and assemblies disclosed herein without departing from the spirit and scope of the invention as defined in the following claims.

What is claimed is:
1. A blender for blending materials, comprising:
a container having an upper end, a lower end and a container opening extending a distance therethrough and intersecting the upper end thereof, the container opening being shaped to receive the material to be blended through the open upper end and to retain such material to be blended generally within the container opening;
a cap removably connectable to the open upper end of the container and substantially closing the open upper end of the container when connected thereto, the cap having a cap base and a cap wall extending a distance generally about the cap base;
a support base having an upper end and a lower end, a receptacle opening being formed through the support base terminating with a receptacle lower end to form a receptacle adapted for receiving the cap with the container connected thereto, the cap being disposed generally near the receptacle lower end when the cap with the container connected thereto is disposed within the receptacle opening, and the support base having a ledge formed on the wall formed by the receptacle opening and extending circumferentially about the receptacle opening, the ledge being spaced a distance above the receptacle lower end adapted to engage the cap to limit the movement of the cap in a direction generally toward the receptacle lower end, the ledge cooperating to position the cap in the receptacle opening spaced a predetermined distance above the receptacle lower end, the support base also having a component space being formed in a portion of the support base, and the receptacle lower end having an opening formed therethrough; a mixer for blending the material, the mixer being connectable to the container and having a portion disposable within a portion of the container opening when the cap is connected to the container, and the mixer comprising:
a mixer shaft extending through a central portion of the cap base, a portion of the mixer shaft extending a distance through the space formed by the cap wall and another portion of the shaft extending a distance in the opposite direction from the cap base;
mixer blades attached to the end portion of the shaft extending through the space formed by the cap wall, the shaft extending the distance from the cap base so the blades are disposed generally within a portion of the container opening in a connected position of the cap and the container; and
means for forming a fluid seal between the cap and the shaft;
a drive assembly having a portion removably engageable with a portion of the mixer, the drive assembly driving the mixer to blend the material in the container in a driving condition of the drive assembly, comprising:
a DC motor supported within the component space for driving the mixer when the motor is in a driving condition and comprising a drive shaft extending through the opening in the receptacle lower end;
a drive connector connected to the drive shaft and being disposed in the receptacle generally near the receptacle lower end;
batteries supported within the component space connected to the motor for conditioning the motor in a driving condition when electrical continuity is established between the motor and the batteries;
a switch supported within the component space and interposed between the batteries and the motor for establishing electrical continuity between the batteries and the motor in a closed position of the switch and for interrupting electrical continuity between the motor and the batteries in an opened position of the switch, the switch being normally opened;

means for positioning the switch in the closed position; and a mixer connector connected to the mixer shaft, the mixer connector being removably connectable to the drive connector, the motor drivingly rotating the mixer blades in a driving condition of the motor when the mixer is connected to the motor via the connection provided via the mixer connector and the drive connector, the cap being supported on the ledge in a connected position of the drive connector and the mixer connector.

2. The blender of claim 1 defined further to include a switch housing connected to the support base and having an opening formed therethrough and intersecting an upper end thereof; and a plunger disposed in the housing opening having an upper end disposed generally below the upper end of the switch housing and a lower end, the lower end of the plunger being engageable with a portion of the switch; and wherein the means for positioning the switch in the closed position is defined further to include means as part of the container for engaging the upper end of the plunger and moving the plunger lower end toward the switch for positioning the switch in the closed position for establishing electrical continuity between the motor and the batteries when the cap with the container connected thereto has been positioned in the receptacle opening.

3. The blender of claim 2 wherein the means as part of the container for engaging the upper end of the plunger is defined further to include:

a switch protrusion connected to the container.

4. The blender of claim 3 wherein the container is defined further to include: a handle adapted to provide a means for grippingly holding the container, the switch protrusion being connected to the handle and extending a distance therefrom.

5. The blender of claim 1 defined further to include:

a battery charger connectable to the batteries and to an AC electrical energy source for recharging the batteries.

6. The blender of claim 1 wherein the means for positioning the switch in the closed position is defined further to include:

a switch housing connected to the support base having a housing opening formed therethrough and intersecting an upper end thereof, the housing opening being in communication with the component space and the switch being disposed in the component space near the housing opening; and a plunger having an upper end and a lower end disposed within the housing opening, the lower end of the plunger engaging a portion of the switch; and wherein means for positioning the switch in the closed position is defined further as engaging the plunger for moving the plunger to position the switch in the closed position.

7. The blender of claim 6 wherein the means for engaging the plunger is defined further to include:

a switch protrusion connected to the container, the switch protrusion engaging the plunger and moving the plunger to position the switch in the closed position when the mixer is connected to the drive assembly.

8. The blender of claim 8 wherein the plunger is defined further as being disposed in the switch housing opening in a position wherein the upper end of the plunger is disposed below the upper end of the switch housing.

9. A blender for blending materials, comprising:

a container having an upper end, a lower end and a container opening extending a distance therethrough and intersecting the upper end thereof, the container opening being shaped to receive the material to be blended through the open upper end and to retain such material to be blended generally within the container opening;

a mixer for blending the material, the mixer being connectable to the container and having a portion disposable within a portion of the container opening;

a support base having an upper end and a lower end, a receptacle opening being formed through the upper end and extending a distance through the support base terminating with a receptacle lower end to form a receptacle for receiving the container;

a switch housing connected to the support base and having an opening formed therethrough and intersecting an upper end thereof;

a plunger disposed in the housing opening having an upper end disposed generally below the upper end of the switch housing and a lower end;

a drive assembly having a portion removably engageable with a portion of the mixer, the drive assembly driving the mixer to blend the material in the container in a driving condition of the drive assembly, comprising:

a motor for driving the mixer when the motor is in a driven condition; and a switch having a normally open end position for interrupting electrical continuity with the motor and a closed position for establishing electrical continuity with the motor thereby conditioning the motor in a driving condition, the lower end of the plunger being engageable with a portion of the switch; and wherein the container is defined further to include means for engaging the upper end of the plunger and moving the plunger lower end toward the switch for positioning the switch in the closed position for establishing electrical continuity with the motor when the container has been positioned in the receptacle opening, thereby substantially preventing the motor from being conditioned in a driving condition unless and until the cap with the container connected thereto has been positioned in the receptacle opening.

10. The blender of claim 9 defined further in include:

a cap removably connectable to the open upper end of the container and substantially closing the open upper end of the container when connected thereto; and wherein the support base is defined further as having the receptacle adapted for receiving the cap with the container connected thereto, the cap being disposed generally near the receptacle lower end when the cap with the container connected thereto is disposed in the receptacle opening; and wherein the mixer is defined further as being connected to the cap, the mixer having a portion disposed within a portion of the container when the cap is connected to the container.

11. The blender of claim 10 wherein the support base is defined further to include a ledge formed on the wall formed by the receptacle opening and extending circumferentially about the receptacle opening, the ledge being spaced a distance above the receptacle lower end and adapted to engage the cap to limit the movement of the cap in a direction generally toward the receptacle lower end, the ledge cooperating to position the cap in the receptacle opening spaced a predetermined distance above the receptacle lower end.

12. The blender of claim 11 wherein the cap is defined further to include a cap base and a cap wall extending a distance generally about the cap base, and wherein the mixer is defined further to include:

a mixer shaft extending through a central portion of the cap base, a portion of the mixer shaft extending a distance through the space formed by the cap wall and another portion of the shaft extending a distance in the opposite direction from the cap base;

mixer blades attached to the end portion of the shaft extending through the space formed by the cap wall, the shaft extending the distance from the cap base so the blades are disposed generally within a portion of the container opening in a connected position of the cap and the container; and means for forming a fluid seal between the cap and the shaft.

13. The blender of claim 12 wherein the support base is defined further to include an opening formed through the receptacle lower end; and wherein the motor is defined further to have a drive shaft, the motor being positioned in a portion of the base and the drive shaft extending through the opening in the receptacle lower end; and wherein the drive assembly is defined further to include:

a drive connector connected to the drive shaft and being disposed in the receptacle generally near the receptacle lower end; and wherein the mixer is defined further to include:

a mixer connector connected to the mixer shaft, the mixer connector being removably connectable to the drive connector, the motor drivingly rotating the mixer blades in a driving condition of the motor when the mixer is connected to the motor via the connection provided via the mixer connector and the drive connector, the cap being supported on the ledge in a connected position of the drive connector and the mixer connector.

14. The blender of claim 9 wherein the means for engaging the upper end of the plunger is defined further to include:

a switch protrusion connected to the container.

15. The blender of claim 14 wherein the container is defined further to include: a handle adapted to provide a means for grippingly holding the container, the switch protrusion being connected to the handle and extending a distance therefrom.

16. The blender of claim 1 wherein the support base includes a component space, and wherein the motor is defined further as being a DC motor supported within the component space for driving the mixer when the motor is in a driving condition, and wherein the drive assembly is defined further to include:

batteries supported within the component space connected to the motor for conditioning the motor in a driving condition when electrical continuity is established between the motor and the batteries.

17. The blender of claim 16 defined further to include:

a battery charger connectable to the batteries and to an AC electrical energy source for recharging the batteries.

* * * * *